United States Patent
Bui et al.

(10) Patent No.: US 8,872,433 B2
(45) Date of Patent: Oct. 28, 2014

(54) ELECTRONIC CONTROL SYSTEM FOR OPERATING A STREET LAMP

(71) Applicant: Hendon Semiconductors Pty Ltd, Hendon (SA)

(72) Inventors: Thi Bui, Hendon (AU); Mark Potter, Hendon (AU); Khanh Le, Hendon (AU); Stephen Francis, Hendon (AU)

(73) Assignee: Hendon Semiconductors Pty. Ltd. (AU)

( * ) Notice: Subject to any disclaimer, the term of this patent is extended or adjusted under 35 U.S.C. 154(b) by 44 days.

(21) Appl. No.: 13/847,519

(22) Filed: Mar. 20, 2013

(65) Prior Publication Data

US 2013/0257295 A1   Oct. 3, 2013

(30) Foreign Application Priority Data

Mar. 27, 2012   (AU) ................................ 2012901201

(51) Int. Cl.
*H05B 37/02*   (2006.01)

(52) U.S. Cl.
CPC ............. *H05B 37/0218* (2013.01); *Y02B 20/72* (2013.01); *Y02B 20/46* (2013.01)
USPC ........... 315/158; 315/149; 315/154; 315/291; 315/362; 323/237; 323/319; 323/320; 323/324; 323/325

(58) Field of Classification Search
USPC .......... 315/149, 154, 158, 291, 362; 323/237, 323/238, 319, 320, 321, 324, 325
See application file for complete search history.

(56) References Cited

U.S. PATENT DOCUMENTS 4,710,699 A * 12/1987 Miyamoto .................... 323/324
6,380,692 B1 * 4/2002 Newman et al. .............. 315/194

* cited by examiner

*Primary Examiner* — Douglas W Owens
*Assistant Examiner* — Thai Pham
(74) *Attorney, Agent, or Firm* — Renner Kenner Greive Bobak Taylor & Weber

(57) ABSTRACT

An electronic control system for operating lighting is rated and operable from normal AC mains supply voltages. A street light controller is adapted to activate a luminaire when ambient light levels are considered too dark and, conversely, when ambient light levels are sufficient, the luminaire is turned off.

12 Claims, 1 Drawing Sheet

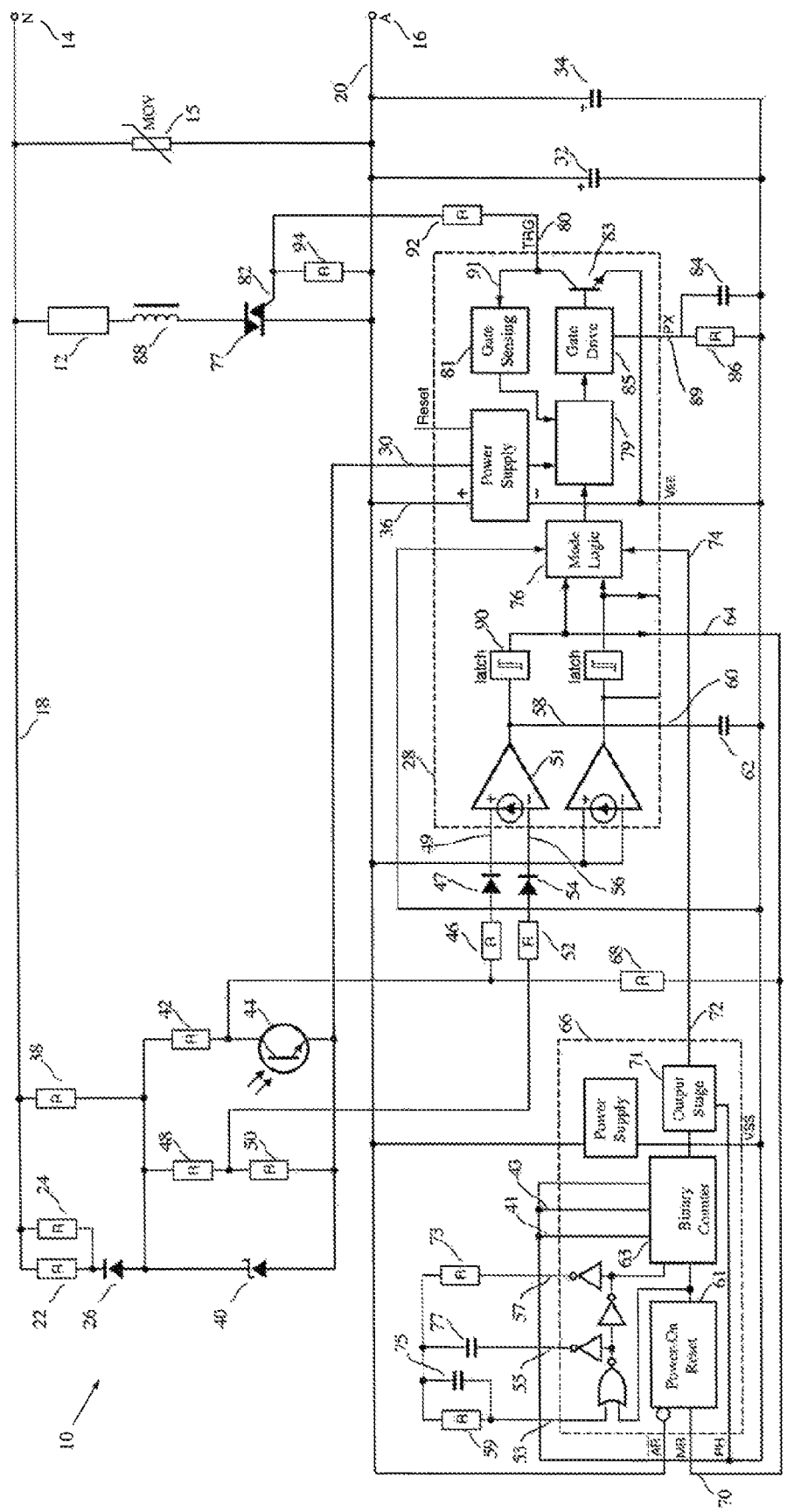

ELECTRONIC CONTROL SYSTEM FOR OPERATING A STREET LAMP

FIELD OF THE INVENTION

This invention relates to an electronic control system for operating lighting which is rated and operable from normal AC mains supply voltages.

In particular this invention relates to a street light controller which is adapted to activate a luminaire when ambient light levels are considered too dark and conversely when ambient light levels are sufficient the luminaire is turned off.

BACKGROUND ART DISCUSSION

Given the endless amounts of street lights that are positioned across our cities in order to provide adequate lighting for improved safety within the community, there has become a requirement that as there are so many individual street lamps, the amount of maintenance and power consumption for the street light needs to be as minimal as possible.

Therefore it follows that the street light controller responsible for activating the luminaire for the lamp should include the most appropriate components, not only from a point of view of power consumption and energy savings, but also potentially conflicting requirements of trying to minimise the cost and the frequency of servicing such street lights.

Conventionally street light controllers utilised electro-mechanical devices and switches but the suitability of such controllers are now being called into significant question as they are characterised with poor energy efficiency, hard initial start up which degrades the life expectancy of the lamp and they also have associated problems in relation to maintenance and potential for damage by power surges and so forth.

More recently electronic solid state street lighting controllers have entered the marketplace that provide opportunity for significant power savings compared to the conventional electro-mechanical devices referred to above and they also do not suffer relay contact wear and tear.

More recently electronic control devices such as TRIACs are being implemented as part of the street light controller in order to manipulate some inherent benefits alternating current provides from the mains power supply.

Using a TRIAC conduction of the AC wave form is not possible at the zero crossing point, meaning that there is a turning on and off of the TRIAC every time the mains crossing point is reached depending on the frequency of the supplied mains power.

A conventional way to overcome this problem has involved the use of electronic controlled systems that drive the gate of the TRIAC through a continuous DC input into the gate of the TRIAC, so that when a zero crossing occurs the TRIAC maintains conduction and the lamp remains powered.

Nonetheless effectively what this means is that once darkness has been detected and the lamp is required to be turned on, a continuous DC input into the gate of the TRIAC is required so that powering is still taking place at the zero crossing intervals of the AC mains supply and no lamp flickering results. This is a waste of energy as effectively the continuous DC input into the gate of the TRIAC is only driving the TRIAC at these zero cross over intervals, and for the majority of the AC wave signal the continuous DC input into the gate of the TRIAC plays no part in keeping the lamp powered as the TRIAC maintains its own conduction outside the zero crossing intervals.

In order to compensate for the zero crossings that are occurring 100 or 120 times per second on AC mains supply of 50 or 60 Hz, the gate of the TRIAC is being fed a continuous DC signal. The continuous on state of the DC signal throughout the entire phase of each AC cycle results in more power consumption.

As stated above there is a continuous requirement now to try and introduce all possible power savings so as to minimise the amount of energy each individual street light consumes and also at the same time to limit the amount of servicing required given the kinds of costs involved In maintaining such street lights.

Therefore it would be particularly advantageous to have a control system in place that can recognise and synchronise zero crossing points in either an inductive or capacitive environment, and provide a single pulse signal to the gate that drives the TRIAC only during zero crossing intervals.

SUMMARY OF THE INVENTION

Accordingly it is an object of this invention to provide an electronic control system for operating the luminaire for a street lamp wherein the signal provided to the gate of a TRIAC that controls mains supply to the lamp for illumination during zero crossing intervals is done so without the requirement of using a continuous DC signal to the gate throughout the entire AC mains cycle.

Further objects and advantages of the invention will become apparent from a complete reading of this specification.

In one form of the invention there is provided an electronic control system for operating a luminaire for a street lamp rated and operable from normal AC mains supply voltages, said electronic control system including;

a comparator;

a first AC input signal to said comparator wherein the first AC input signal provides a reference current, and a second AC input signal to said comparator derivable from a photo detector arrangement, wherein the second AC input signal provides a measured current, such that the comparator establishes an output DC current of magnitude and direction directly proportional to the instantaneous difference in magnitude between the first AC input signal and the second AC input signal to the comparator;

a capacitor in communication with said output DC current established from the comparator such that at a threshold voltage level of the capacitor a responsive signal is made available;

a TRIAC connected to the mains supply to control and conduct power to the luminaire for illumination of the lamp wherein the TRIAC is in communication with the responsive signal such that once the responsive signal has been made available the TRIAC conducts AC mains supply through to the luminaire;

a trigger circuit including a bi-polar junction transistor wherein the bi-polar junction transistor switches on for a period during a zero crossing interval of the AC mains supply wherein the zero crossing interval is detected by a sensor in communication with the gate of the TRIAC, such that the turning ON/OFF of the bi-polar transistor triggers a pulsed signal to the gate of the TRIAC so that the pulsed signal is adapted to drive the gate of the TRIAC during zero crossing intervals to maintain conduction of the TRIAC for the full complete cycle of the AC mains supply.

Rather than having a continuous stream of DC being sent to the gate of the TRIAC over the complete AC cycle, there is a controlled pulse signal that synchronizes with the zero crossing intervals. The gate is provided with a signal only during that interval when the gate needs to drive the TRIAC to maintain conduction in the TRIAC.

In conventional arrangements, to make sure the TRIAC conducts through the complete AC cycle, a continuous DC signal is provided to the gate of the TRIAC. As stated above this is a waste of energy and places greater unnecessary use upon the gate of the TRIAC, as the gate is only required to be driven during the zero crossing intervals.

The pulse signal is available due to the fact that the trigger circuit must recognise when a zero crossing is detected at the gate of the TRIAC and accordingly a gate sensor is included as part of the trigger circuit so it can work in communication with the gate of the TRIAC to determine when the next zero crossing point will occur irrespectively of whether the lamp being controlled provides an inductive or capacitive load.

By being able to utilise the gate sensor as part of the trigger circuit to recognise and detect the points of time in which the TRIAC gate needs to be driven during zero crossing points or intervals for establishing a potential on state of the TRIAC to maintain conduction this replaces the requirement of the conventional type of trigger circuit for controlling the gate of the TRIAC, through a DC signal that is continuous.

As introduced above the electronic control system provides conduction through the TRIAC during each full cycle and as the person skilled in the art will appreciate, mains power is comprised of an alternating current that flows in one direction and then in the other, along wiring at a rate of 50 or 60 cycles per second dependent on the country's power system. This current alternates back and forward changing directions at the zero point and it is at this instant in time that no current is flowing in either direction. This is the point at which the gate of the TRIAC receives the pulse signal to maintain the conduction of the TRIAC.

In preference in an alternative embodiment there is a voltage comparator, and the comparator works with voltage differences from AC input signals to the comparator.

In preference the comparator, bi-polar junction transistor, gate sensor, timing and synchronisation controller are all contained and within functional communication within the one single integrated circuit.

In preference a diode separates the electronic control system from the mains supply so that charge is taken from the AC mains supply during negative going half phase of each complete AC cycle.

The use of the diode allows an amount of current to power the circuit during the negative half cycle, and a capacitor to maintain the supply during the positive half cycle, and use of an amount of power to energise the light sensor part of the circuit on positive half cycles. The reason for this is that these type of "shunt" power supplies usually waste the power in one half cycle, because it is the wrong polarity to add to the power supply. Rather than waste the power, in a preferred embodiment it is blocked with a diode.

In preference an inductor is electrically positionable between the TRIAC and the load of the luminaire for the street lamp.

An advantage of such an arrangement is that there is limit to the maximum rise of current when the TRIAC is first switched on thereby protecting the TRIAC and once again adding to the longevity of the componentry making up this electronic control system for operating the luminarie for the street lamp.

Conventionally a resistor and capacitor would be placed across the TRIAC but as discussed in the pre-amble of this specification, loads associated with street lighting have significantly different power requirements depending on the material used such as a metal halide, high pressure sodium, a compact fluorescent, mercury vapour or linear fluorescent and the category in which it belongs whether it be an inductive or capacitive load.

Therefore the conventional arrangement of using a capacitor and resistor across the TRIAC such as in a snubber circuit means that in some instances loads cannot fully switch themselves off.

One of the purposes of this invention was to provide the most efficient power consuming arrangement and if the load is not able to completely switch itself off this leads to a scenario where the light, though only at a low level, could potentially be on during the day which means that unwanted energy is being consumed and the longevity of the componentry of the street lamp again has been reduced.

The introduction of the inductor between the lamp load and the TRIAC advantageously eliminates the requirements and the use of a more conventional snubber circuit providing a design which will see the load switching itself off completely as required when the photo detector has acknowledged that the ambient light level is sufficient for the luminaire to be turned off.

BRIEF DESCRIPTION OF THE DRAWINGS

In order now to describe the invention in greater detail a preferred embodiment will be presented here with the assistance of the following illustrations and accompanying text.

FIG. 1 is a circuit diagram for the system in a preferred embodiment of this invention.

DETAILED DESCRIPTION OF THE INVENTION

Referring to the drawings now in greater detail wherein an electronic control system shown generally as (10) for operating the luminarie for the street lamp, which in FIG. 1 is referred to as the load shown as (12), wherein that load can be considered either an inductive or capacitive load and the load that the electronic control system must drive can vary considerably and include such luminaire as being metal halides, high pressure sodium, mercury vapour, compact fluorescents and linear fluorescent.

Mains power shown generally as (14) and (16) as the neutral and active respectively, comprises of an alternating current that flows as is to be expected in one direction and then the other, along single lines (18), (20) respectively at a rate of 50 or 60 cycles per second dependent upon the country in which this electronic control system for operating the luminaire for the street lamp is used. The metal oxide varistor (MOV) (15) provides surge protection for the circuit.

Diode (26) provides the functionality such that an amount of current to power the integrated circuit (28) is completed during the negative half cycle, and capacitors (32) (34) maintain the supply during the positive half cycle. Capacitors (32) and (34) charge during the negative half cycles brought around by the introduction of the diode (26) that are able to maintain continuous positive supply as required to the integrated circuit (28) for functional operation along line (36) during the positive phase of the AC cycle.

As the person skilled in the art would appreciate capacitors (32) and (34) could be a single capacitor as they are currently aligned in parallel but in order to provide a more economical and cost effective electronic control system lower rated capacitors can be used in parallel.

Supply resistors (22) and (24) provide the required power level to the integrated circuit (28) for the power line (30). They are arranged in parallel to reduce the amount of power passing through each of the respective resistors (22) and (24). Hence making available the use of less expensive resistors and greater space savings.

Resistors (38), (42) and (46) along with the Zener diode (40), photo-transistor (44) and diode (47) all form part of the arrangement in establishing the second AC input signal into the comparator (51) which is a part of the integrated circuit (28).

Resistor (38) provides the working reference voltage of the Zener diode (40) to which the photo-transistor (44) as a light sensor can work with.

Resistor (42) functions preferably as a variable resistor in order to match up correctly with the selected photo-transistor (44) of which levels of resistance can vary depending on relevant tolerance.

Resistor (46) is there to convert the voltage signal at the photo-transistor (44) into a current input signal (49) to the current comparator (51).

Resistors (48), (50), (52) and diode (54) are part of the arrangement which supplies the first AC input signal referred generally as the reference voltage upon input line (56) into the comparator (51).

Resistors (48) and (50) provide a reference to which the measured voltage can be compared with and wherein resistor (52) is incorporated again to convert the reference voltage signal into a current input signal (49) to the current comparator (51).

The comparator (51) establishes an output current (58) which is fed to the output line (60) of the integrated circuit (28) wherein the capacitor (62) charges or discharges dependent upon the output current from the comparator which is dependent upon the instantaneous difference in magnitude between the referenced input AC signal (56) against the measured AC input signal (49) into the comparator (51).

As would be expected during the day capacitor (62) would discharge as the photo detector arrangement of the photo-transistor (44), zener diode (40) being compared with the reference signal arrangement acknowledges the requirement to turn off the luminaire when the ambient light levels are considered too bright or conversely when the ambient light levels are insufficient the luminaire will be turned on.

Latch (90) has a fixed threshold voltage at which it changes state, and in addition a small hysteresis in this level to avoid oscillation. When Capacitor (62) drops below the threshold level on latch (90), for example ambient light levels are considered too bright and the luminaire needs to be turned off, the electronic control system (10) recognises this situation and sends an output logic LOW signal (64) from the integrated circuit (28) to a integrated circuit which has timing functionality and shown generally as (66).

This output signal (64) from the integrated circuit (28) is in electrical communication with resistor (68), wherein resistor (68) provides a degree of hysteresis, for example in instances when the photo-transistor (44) is detecting light levels decreasing, which may only be the result of a passing cloud or some more momentary disruption to the general ambient light levels rather than simply a transformation from night to day.

AC Inputs signals (56) and (49) form the two (current) inputs to the (current) comparator (51), and result in an intermediate (current) output at (60), which charges or discharges capacitor (62). The voltage on this capacitor (62) is latched (90) at a specific threshold into a logic state output at (64). Thus (64) has two states, one representing day (LOW), one representing night (HIGH).

When the logic signal (64) is LOW, some current is pulled away from the comparator (51) AC input signal (49) via resistor (68). The photo-transistor (44) normally also pulls current away from the source resistor (42). The less light, the less current photo-transistor (44) pulls away from the comparator (51) input ac signal (49), and therefore it is able to overcome the extra current pulled away by resistor (68).

When the logic state at (64) is HIGH, this additional current is not stolen away, and therefore more current is required to be pulled away through photo-transistor (44) to achieve the same level at the comparator (51) AC input signal (49). Thus the amount of current through the photo-transistor (44) required to achieve the same input current at (64) depends on the present state of the circuit "night" or "day".

The commencement of a logic LOW at 70, the input to Power-On/Reset functional block (61) of the integrated timer circuit 66, allows the integrated timer circuit 66 to start counting out a delay period. The clock frequency into the counter is derived from resistors (59), (73) and capacitors (75), (77) connected to pin (53), pin (55) and pin (57) that feed into logic gates (67a)(67b)(67c)(67d) of the integrated timer circuit 66, while the logic levels at pin A0 (41) and pin A1 (43) determine the count length and together with the binary counter (63) and output stage (71) result in a delayed logic output signal (72) which commences a notification to the functionality within-side the integrated chip (28) that it is time for the load (12) to be turned off.

In the preferred embodiment shown the output (72) from the integrated timing circuit (66) to the integrated circuit (28) produces a HIGH on line (74).

This HIGH signal (74) to the integrated circuit (28) activates internal mode logic (76) which indicates that the TRIAC (77) needs to be turned off so that the load (12) may become disconnected from the mains supply.

The control of the TRIAC (77) by the electronic control system (10) is such that once the mode logic (76) has been notified that it is time for the load (12) to be linked to the main supply so that the street lamp may be illuminated recognition is that functional ability within the integrated circuit (28) through a zero crossing timing and synchronization controller (79) will activate the trigger circuit such that at the next zero crossing a trigger pulse (80) will be fed from the integrated circuit (28) to the gate (82) of the TRIAC (77).

The gate sensor (81) works in conjunction with the zero crossing timing and synchronization controller (79) to determine when the next zero crossing will occur as the gate sensor (81) is continually monitoring the gate (82) of the TRIAC (77).

As introduced above, the window of operability of the bi-polar junction transistor (83) becomes usable during the zero crossing intervals of the AC cycle but rather than providing a continual signal along line (80) feeding into the gate (82) of the TRIAC (77) the trigger (80) to the gate (82) of the TRIAC (77) is pulsed predetermined by the timing arrangement of capacitor (84) and resistor (86) of which pulsed information is sent into the gate drive (85) base of the transistor) which is working again in combination with the zero crossing timing and synchronization controller (79) in conjunction with the gate sensor (81).

In the preferred embodiment of the invention the triggered pulse (80) sent to the gate (82) of the TRIAC (77) would be triggered or activated by negative edged pulses.

Resistor (92) sets the amount of gate current into the TRIAC (77) and the resistor (94) ensures the TRIAC (77) is held off when no current is being supplied to the gate (82).

Inductor (88) separates the TRIAC (77) from the load (12) thereby minimizing the rate rise of current when the TRIAC is first switched on and continuously thereafter while connected to the mains supply.

Rather than simply continuously providing a gate drive (85) to the bi-polar transistor (83) throughout the AC cycle, gate drive (85) is only made available once zero crossing timing and synchronization has been achieved through the use of the gate sensor (81) monitoring the gate (82) of the TRIAC (77).

The additional input (89) into the gate driver (85) for the establishment of a predetermined pulse by virtue of capacitor (84) and resistor (86) which fluctuates the voltage level which appears at the base of the bi-polar junction transistor (83), provides the pulse that can be tapped off at the collector (91) side of transistor (83) to drive the gate (82) of the TRIAC (77) only as required during zero crossing intervals of the AC mains supply cycle, wherein the TRIAC (77) needs to be driven by the gate (82) to maintain conduction. Hence the width of the pulse being triggered to the gate (82) of the TRIAC (77) can be varied as required depending on the TRIAC used.

The invention claimed is:

1. An electronic control system for operating a luminaire for a street lamp rated and operable from normal AC mains supply voltages, said electronic control system including;
    a comparator;
    a first AC input signal to said comparator wherein the first AC input signal provides a reference current, and a second AC input signal to said comparator derivable from a photo detector arrangement, wherein the second AC input signal provides a measured current, such that the comparator establishes an output DC current of magnitude and direction directly proportional to the instantaneous difference in magnitude between the first AC input signal and the second AC input signal to the comparator;
    a capacitor in communication with said output DC current established from the comparator such that at a threshold voltage level of the capacitor a responsive signal is made available;
    a TRIAC connected to the AC mains supply to control and conduct power to the luminaire for illumination of the lamp wherein the TRIAC is in communication with the responsive signal such that once the responsive signal has been made available the TRIAC conducts AC mains supply through to the luminaire;
    a trigger circuit including a bi-polar junction transistor wherein the bi-polar junction transistor switches on for a period during a zero crossing interval of the AC mains supply wherein the zero crossing interval is detected by a sensor in communication with the gate of the TRIAC, such that the turning ON/OFF of the bi-polar transistor triggers a pulsed signal to the gate of the TRIAC so that the pulsed signal is adapted to drive the gate of the TRIAC during zero crossing intervals to maintain conduction of the TRIAC for a complete cycle of the AC mains supply.

2. The electronic control system of claim 1 wherein the comparator, bi-polar junction transistor, gate sensor, timing and synchronisation controller are all contained and within functional communication within the one single integrated circuit.

3. The electronic control system of claim 1 wherein a diode separates the electronic control system from the AC mains supply so that charge is taken from the AC mains supply during negative going half phase of each complete AC cycle.

4. An electronic control system for operating a luminaire for a street lamp rated and operable from normal AC mains supply voltages, said electronic control system including;
    a voltage comparator;
    a first AC input signal to said voltage comparator wherein the first AC input signal provides a reference voltage, and a second AC input signal to said voltage comparator derivable from a photo detector arrangement, wherein the second AC input signal provides a measured voltage, such that the voltage comparator establishes an output DC current of magnitude and direction directly proportional to the instantaneous difference in magnitude between the first AC input signal and the second AC input signal voltages to the voltage comparator;
    a capacitor in communication with said output DC current established from the voltage comparator such that at a threshold voltage level of the capacitor a responsive signal is made available;
    a TRIAC connected to the mains supply to control and conduct power to the luminaire for illumination of the lamp wherein the TRIAC is in communication with the responsive signal such that once the responsive signal has been made available the TRIAC conducts AC mains supply through to the luminaire;
    a trigger circuit including a bi-polar junction transistor wherein the bi-polar junction transistor switches on for a period during a zero crossing interval of the AC mains supply wherein the zero crossing interval is detected by a sensor in communication with the gate of the TRIAC, such that the turning ON/OFF of the bi-polar transistor triggers a pulsed signal to the gate of the TRIAC so that the pulsed signal is adapted to drive the gate of the TRIAC during zero crossing intervals to maintain conduction of the TRIAC for a complete cycle of the AC mains supply.

5. The electronic control system of claim 4 wherein the voltage comparator, bi-polar junction transistor, gate sensor, timing and synchronisation controller are all contained and within functional communication within the one single integrated circuit.

6. The electronic control system of claim 4 wherein a diode separates the electronic control system from the AC mains supply so that charge is taken from the AC mains supply during negative going half phase of each complete AC cycle.

7. The electronic control system of claim 6 wherein an inductor is electrically positionable between the TRIAC and the load of the luminaire for the street lamp.

8. The electronic control system of claim 7 further including a metal oxide varistor for surge protection.

9. The electronic control system of claim 8 wherein the sensor in communication with the gate of the TRIAC is in communication with a zero crossing timing and synchronization controller to determine when the next zero crossing will occur as the sensor in communication with the gate of the TRIAC is continually monitoring the gate of the TRIAC.

10. The electronic control system of claim 9 wherein a bi-polar transistor triggered pulsed signal to the gate of the TRIAC is triggered or activated by negative edged pulses.

11. The electronic control system of claim 10 wherein a resistor sets the amount of gate current into the TRIAC.

12. The electronic control system of claim 11 wherein a resistor ensures the TRIAC is held off when no current is being supplied to the gate of the TRIAC.

\* \* \* \* \*